April 30, 1968 I. ISRAELY 3,381,275

DIGITAL INFORMATION TRANSFERRING SYSTEM

Filed Aug. 10, 1965 6 Sheets-Sheet 1

INVENTOR.
ILAN ISRAELY

BY [signature]
ATTORNEY.

DIGITAL INFORMATION TRANSFERRING SYSTEM

Filed Aug. 10, 1965

INVENTOR
ILAN ISRAELY
BY [signature]
ATTORNEY

INVENTOR.
ILAN ISRAELY
BY
[signature]
ATTORNEY.

INVENTOR
ILAN ISRAELY
BY
Fred G. Schmid
ATTORNEY.

DIGITAL INFORMATION TRANSFERRING SYSTEM

INVENTOR.
ILAN ISRAELY
BY
Fred E. Schwend
ATTORNEY.

INVENTOR.
ILAN ISRAELY
BY
Fred G. Schmid
ATTORNEY

United States Patent Office 3,381,275
Patented Apr. 30, 1968

3,381,275
DIGITAL INFORMATION TRANSFERRING SYSTEM

Ilan Israely, Los Angeles, Calif., assignor to Clary Corporation, San Gabriel, Calif., a corporation of California Filed Aug. 10, 1965, Ser. No. 478,715
5 Claims. (Cl. 340—172.5)

ABSTRACT OF THE DISCLOSURE

A circuit for transferring data from a digit registering device including a plurality of columns of switches representing, respectively, the digits 0 to 9, to a ten-key type registering machine, wherein a stepping register is provided, the latter being scanned successively through its various stages by clock pulses. Each stage of the stepping register, when scanned, conditions a respective one of said columns of switches. All of the switches representing a particular digit are connected to an amount entering device on the machine representing that digit. The last stage of the stepping register is effective, when scanned, to cause operation of the machine.

This invention relates to means for serially transferring information from one information registering device to another and has particular reference to means for serially transferring information from a digit registering device containing denominationally arranged columns of contact closure switches to a second digit registering and/or recording device.

A principal object of the present invention is to provide a simple yet highly reliable apparatus for serially transferring digital information from the different denominational orders of a digit registering device into a recording and/or registering machine of the ten-key type.

Another object is to provide apparatus of the above type for serially transferring information at a relatively high rate of speed from a digit registering device containing contact closure switches representing digits to a recording and/or registering machine of the ten-key type.

The manner in which the above and other objects of the invention are accomplished will be readily understood on reference to the following specification when read in conjunction with the accompanying drawings, wherein.

Figure 1:
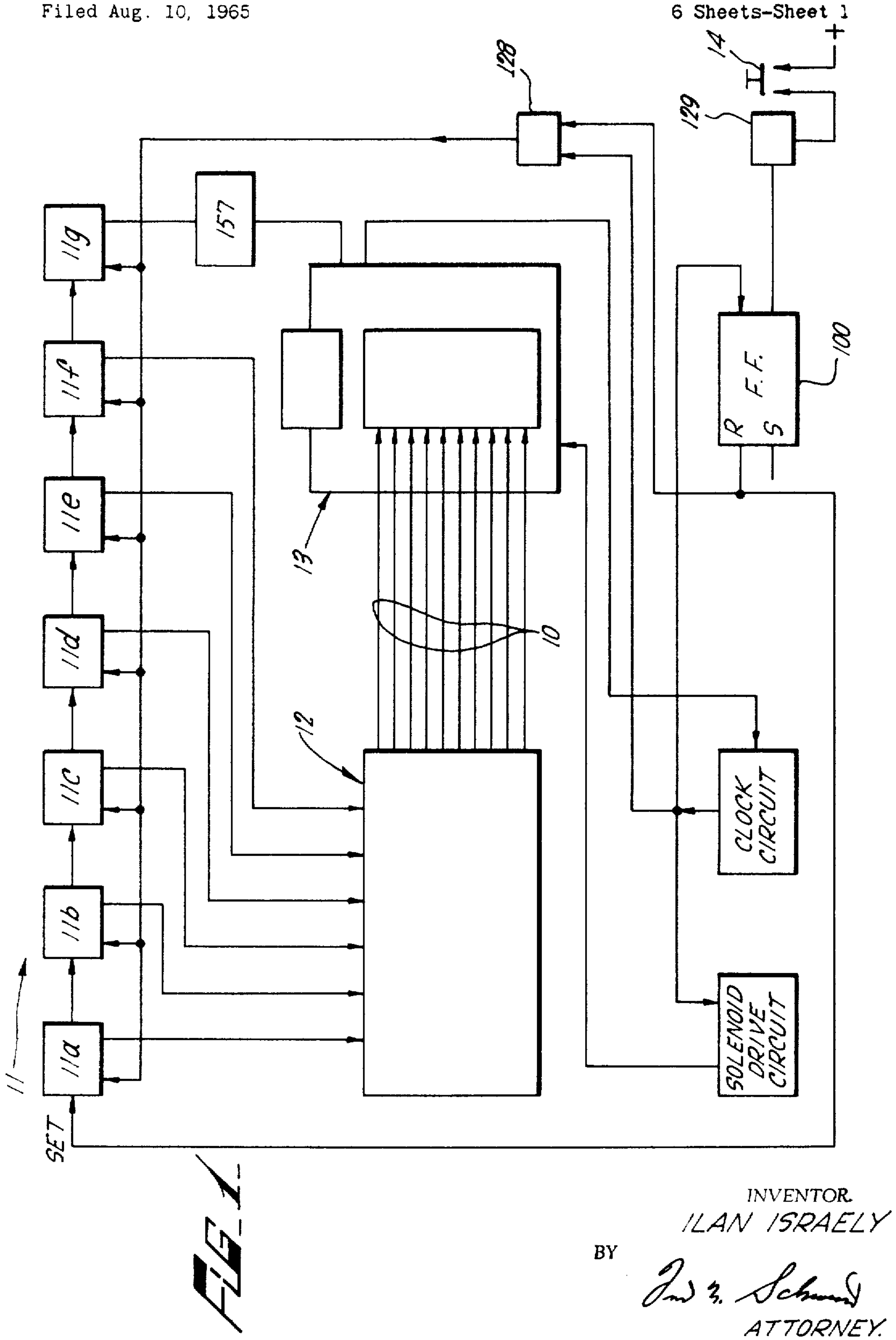
FIG. 1 is a schematic view of an information transferring system embodying a preferred form of the present invention.

Referring in particular to FIG. 1, the system comprises generally a stepping register, generally indicated at 11, a device 12, such as a digital voltmeter, which indicates a digital value by means of columns of contact switches, and a readout recording device 13.

Upon initiation of operation of the stepping register, in a manner to be described later, by closing a normally open switch 14, the register successively scans the various denominational columns of contact switches in the device 12 by successively energizing its various stages and transfers the digital values represented thereby over ten digit lines 10 to the readout device 13. The last stage **11*g* of the stepping register is effective to initiate operation of the readout device 13, causing it to record the digital value registered by the device 12**.

*Stepping register*

Figure 2:
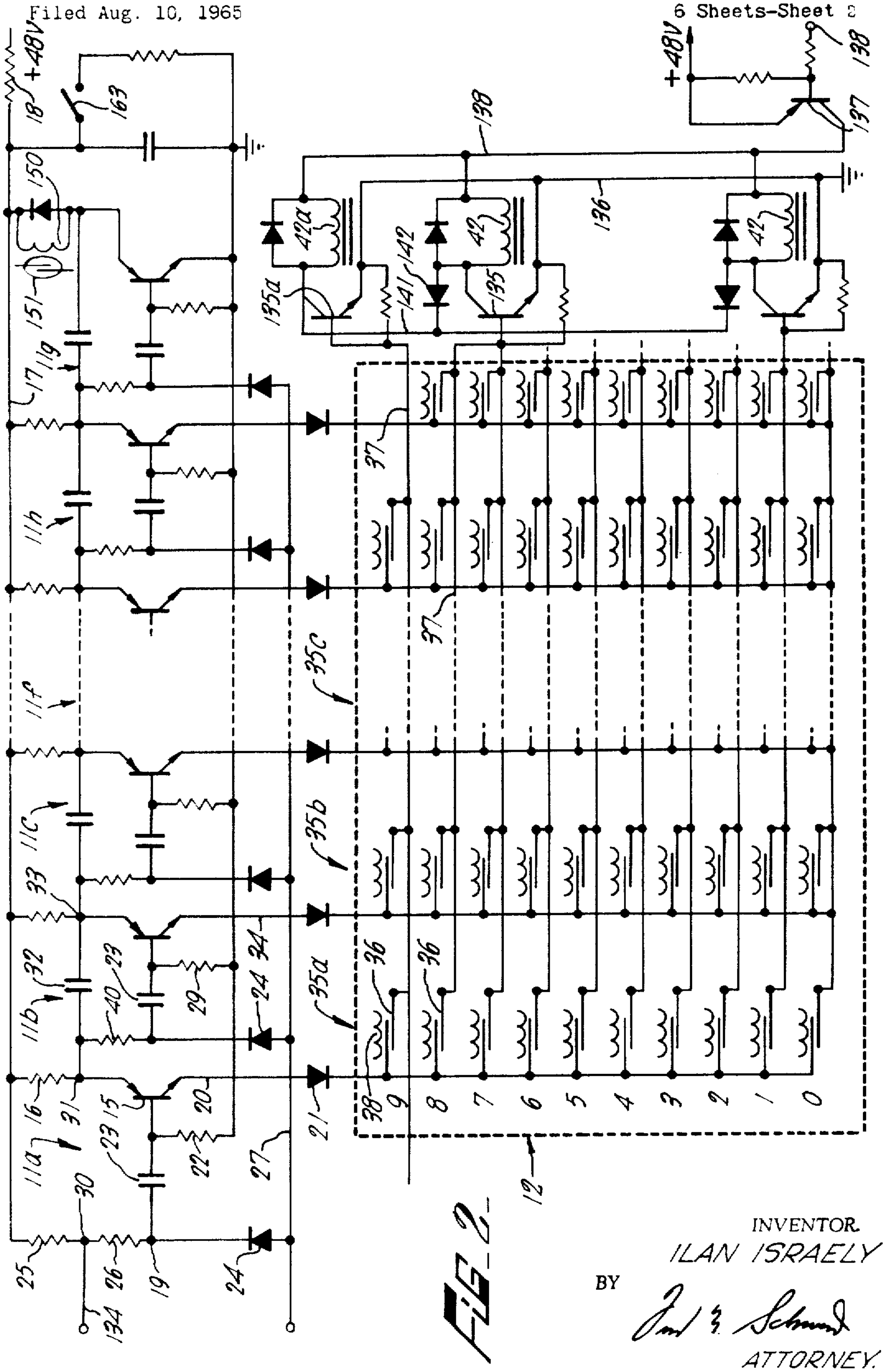
FIG. 2 is a detailed schematic view of the stepping register and the controls for the recorder.

The stepping register 11 (see also FIG. 2) comprises a plurality of register stages **11*a* to 11*g*, each stage comprising a transwitch 15** which may be of the type No. TSW 60, manufactured by Transitron Electronic Corporation. A transwitch is similar to a transistor in function except that when the device becomes conductive, as by applying an appropriate signal to the base thereof, it will remain conductive after removal of the signal and will require removal of at least a major portion of the supply voltage thereto or opening of the emitter-collector circuit to become non-conductive.

The collector of each transwitch 15 is connected through a 560 ohm resistor 16 to a voltage supply line 17 which, in turn, is connected through a resistor 18 to a source of 48 volts. The emitter of each transwitch is connected through a line, i.e., 20, and diode 21 to a respective denominational column, i.e. **35*a*, of the digit registering device 12**.

The base of the transwitch 15 in the first stage **11*a* of the stepping register is connected through a 1K resistor 22 to ground and through a .0022 mfd. capacitor 23 to the juncture 19 of a diode 24 and a pair of series connected 1K and 47K resistors 25 and 26, respectively, the former being connected to the voltage supply line 17**.

The bases of the remaining transwitches are similarly connected to ground through resistors, i.e. 29, to ground and through 47K resistors, i.e. 40, to the junctures of resistors 16 and .068 mfd. capacitors 32.

Normally, the transwitches in the various stages of the stepping register are in non-conducting condition and in each stage, a full supply voltage is applied from line 17 to the lefthand side of each of the capacitors 23, thereby preventing the positive going component of a clock pulse applied over line 27 and through diodes 24 from causing conduction. However, upon grounding the juncture 30 between the resistors 25 and 26, the charge on capacitor 23 in the first stage **11*a* is reduced sufficiently so that a succeeding pulse applied over line 27 will be transmitted by the respective capacitor 23 to cause conduction of the first transwitch 15, thereby causing current to flow in the line 20**.

The drop in voltage at point 31 charges capacitors 32 and 23 in the second stage **11*b*, thereby conditioning this stage to be turned on upon receipt of the next clock pulse over line 27. At the time such second stage conducts, a pulse is transmitted from point 33, through capacitor 32 to the point 31, thereby rendering the transwitch 15 in the first stage 11*a* nonconductive while current will flow through line 34** connecting the second stage with the second denominational column of the registering device.

The foregoing stepping of the register 11 will continue upon application of succeeding pulses over line 27 until all stages have been momentarily rendered conductive.

*Digit registering device*

The device 12, as stated before, may be of a type, such as a digital voltmeter, having a number of denominationally arranged columns **35*a*, 35*b*, 35*c*, etc. (FIG. 2), each connected to ten normally open switches representing, respectively, the digtis 0 to 9. All forward contacts of the switches representing the same digit, i.e., 9, are connected together by a line 37**, forming a digit output for the device.

The switches 36 are indicated as being closable by respective electromagnets 38, energized by suitable circuits (not shown), which are capable of holding selected switches closed until completion of the scanning operation by the stepping register 11.

*Recorder*

Figure 6:
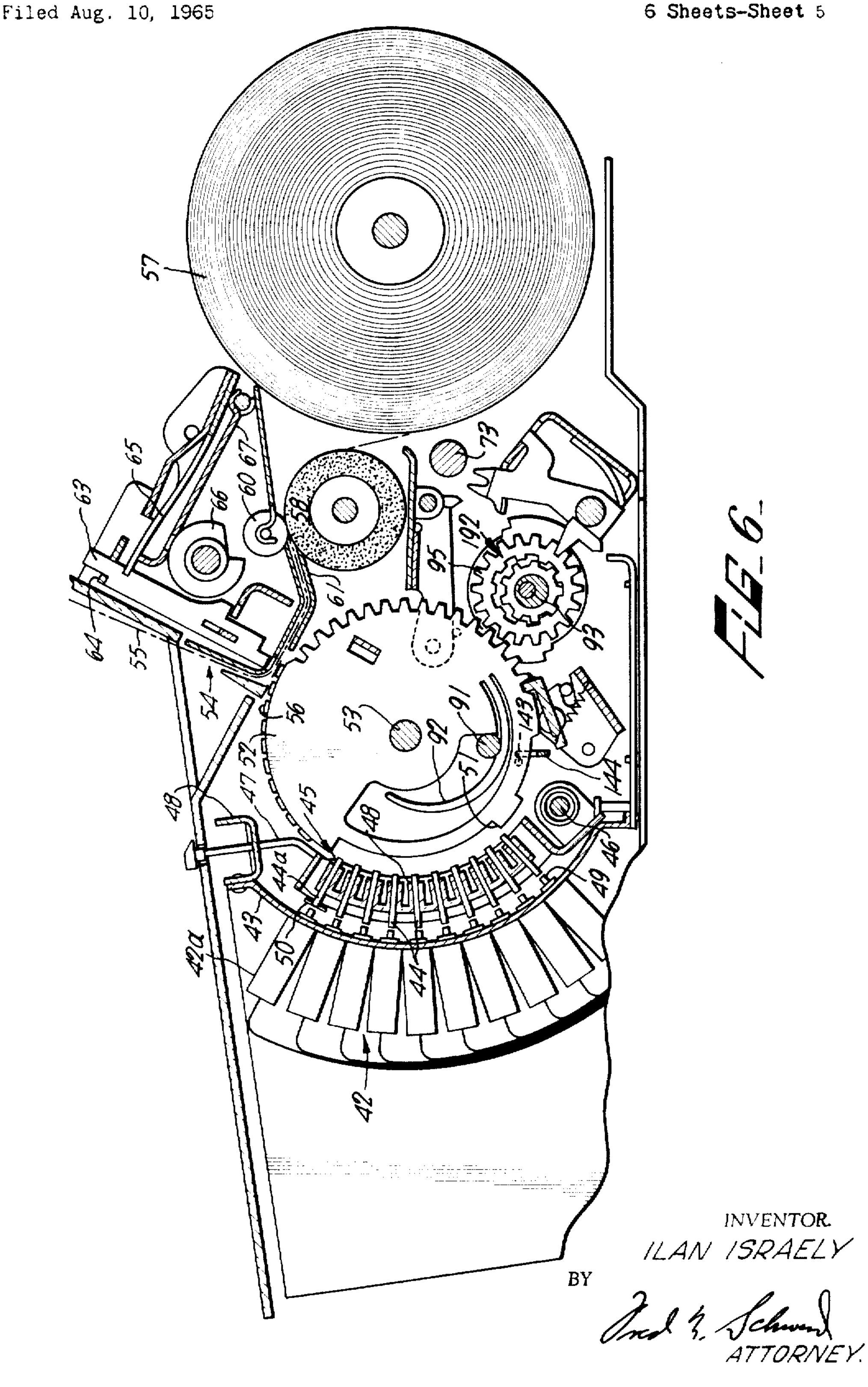
FIG. 6 is a sectional view through the recorder.
Figure 8:
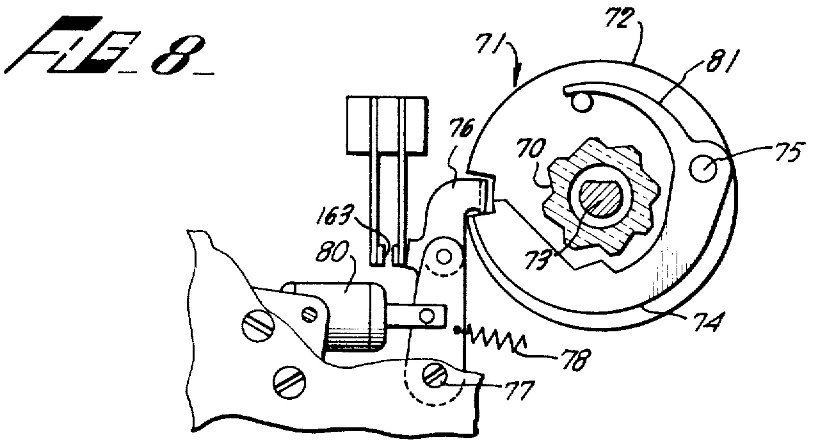
FIG. 8 is a sectional view illustrating the clutch and controls of the recorder.
Figure 7:
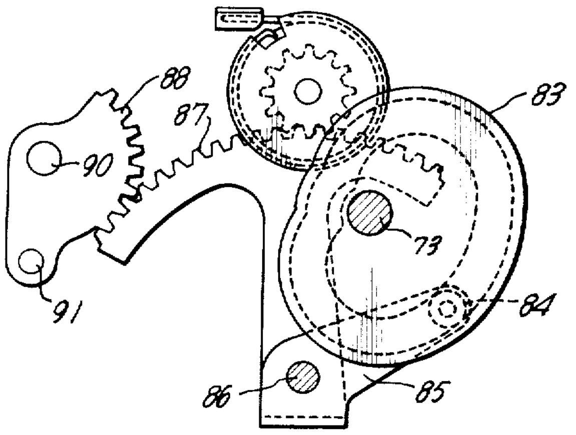
FIG. 7 is a sectional view illustrating the sector drive mechanism of the recorder.

The recorder shown in FIGS. 6, 7 and 8 is of the so-called ten-key type, basically similar to the well known and commercially available Addmaster adding-listing machine. The latter is generally disclosed and claimed in the patents to R. E. Buch No. 3,113,719, issued on Dec. 10, 1963 and to H. L. Clary et al. No. 3,132,582, issued on May 12, 1964. Reference may therefore be had to such patents for an understanding of details of the machine not specifically disclosed herein.

Referring to FIG. 6, digits of a value are entered by means of a bank of ten solenoids 42 instead of the usual ten keys shown in the above patent. The solenoids are arranged in a vertical column mounted in an arcuate frame plate 43 in radial alignment with horizontally arranged rows of stop pins 44 carried by an arcuate pin carriage 45. The latter is slideable along a support rod 46 and carries a tab 47 at the upper end thereof which is guided along a slot formed in a frame bracket 48.

The stop pins 44 are arranged in a number of vertical columns equal to the number of denominational orders of the machine. The upper stop pin 44*a* in each column forms an escapement pin which is adapted to limit against a stop shoulder 50 under the urge of a spring, not shown, attached between the pin carriage and the machine frame.

Momentary closing of an electric circuit, to be described later, will activate a corresponding solenoid, closing its armature 49 to set an aligned stop pin 44 inwardly into the path of a shoulder 51 formed on an aligned printing sector 52. At the same time, the upper solenoid 42*a* is energized, causing its armature to push the aligned stop pin 44*a* below the surface of the stop shoulder 50, thereby permitting the carriage to shift to the left (when viewing the machine from the front) so as to align a new column of stop pins with the solenoids 42.

The various sectors 52 are located in the different denominational orders of the machine and are independently mounted for pivotal movement on a support shaft 53. The latter sectors cooperate with a printing mechanism, generally indicated at 54, to print amounts registered by the sectors 52 onto a paper strip 55. For this purpose, each sector carries a series of type characters 56 on its periphery, arranging in value from 0 to 9, the character 0 being located at the clockwisemost location relative to the rest of the series.

The paper strip 55 is fed from a supply roll 57, between gripping feed rolls 58 and 60, through a guideway 61 and past a printing station located between the sectors 52 and vertically movable hammers 63.

The hammers are slideably guided for endwise vertical movement in a frame 64, toward and away from contact with the paper strip 55. Leaf spring elements 65 urge the hammers downwardly but are normally restrained by a rotatable cam 66 which operates through a cam follower bail 67 to normally hold the hammers in their upper illustrated position.

The recorder is cyclically operable and is driven by a motor driven ratchet member 70, FIG. 8, forming part of a cyclically operable clutch, generally indicated at 71. The latter comprises a driven element 72 attached to a drive shaft 73. A clutch member 74 is pivotally supported at 75 by the element 72 and is normally held in disengaged position by a clutch dog 76, pivotally supported at 77 and urged toward clutch disengaging position by a tension spring 78. Upon energization of a solenoid 80, its armature will withdraw the clutch dog 76, allowing the clutch member 74, under the urge of a spring tail 81 thereon to engage the ratchet member 70 so as to drive the shaft 73 through one complete revolution whereupon the clutch dog will re-engage the member 74 to disengage the clutch.

The sectors 52 are yieldably driven from their initial position shown in FIG. 6 until arrested by different set ones of the stop pins 44 and for this purpose, a cam 83, FIG. 7, is attached to the shaft 73 and engages a roller 84 carried by cam follower 85, pivotally supported at 86, and provided with a gear sector 87 meshing with a gear sector 88. The latter sector is attached to a rock shaft 90 which carries a second sector similar to sector 88. Both sectors carry between them an actuator rod 91. The rod 91 engages shoulders formed on yieldable tails 92 integral with the various printing sectors 52 whereby to yieldably advance the latter clockwise during the first half of a cycle until differentially arrested by set ones of the stop pins 44.

Means, not shown, are provided for transmitting rotation from the shaft 73 to the cam 66, FIG. 6, to effect a printing operation of the hammers 63 at a midpoint in the machine cycle and after the sectors 52 have been differentially advanced.

The sectors 52 are also effective to differentially actuate an accumulator generally indicated at 192. The latter is of the crawl carry type and in general comprises denominationally arranged gears 95 and other entrained gear elements all rotatably supported by an accumulator shaft 93.

The accumulator is normally held out of cooperative relation with the sectors 52 but during an item entry or totalling operation, it is raised to mesh the gears 95 with gear teeth on the sectors 52 so as to register amounts printed by the sectors or to total out and print amounts registered by the accumulator.

*Control circuit*

Figure 4:
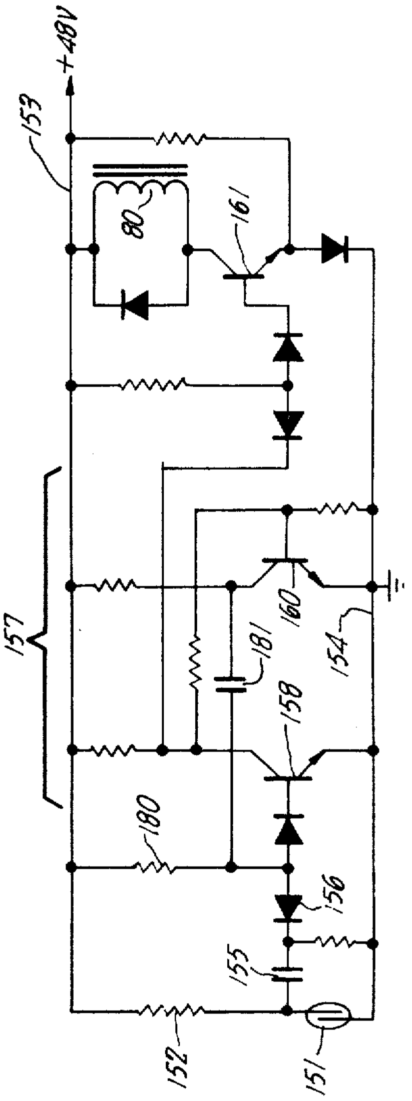
FIG. 4 is a detailed schematic view of the control circuitry for causing a printing operation of the recorder.
Figure 5:
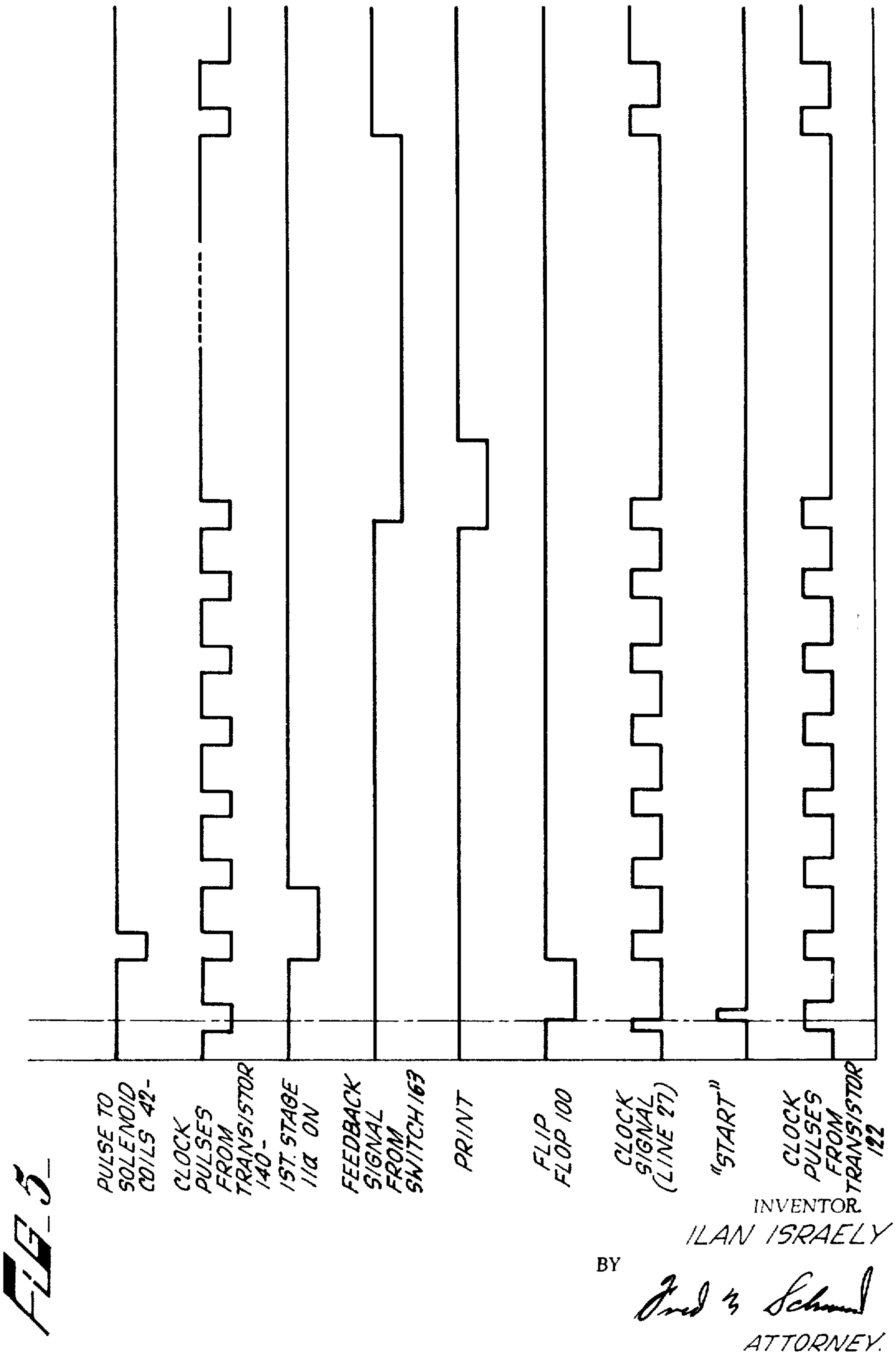
FIG. 5 is a schematic view illustrating the timing relation between the various clock and other signals.

The system is set into operation by closing the aforementioned switch 14, FIGS. 1 and 4, which controls the flip-flop generally indicated at 100 to gate a free running multi-vibrator 101 so as to apply clocking pulses to the stepping register to effect scanning of the digit registering device 12.

The flip-flop 100 is of well known construction in which two transistors 102 and 103 are provided, having their bases and collectors cross-connected through parallel connected resistors 104 and capacitors 105. Positive potential is applied over line 106 and resistors 107 to the collectors of the transistors and their emitters are connected directly to a ground line 108.

The flip-flop 100 is normally held in reset condition wherein the transistor 103 is conducting and transistor 102 is non-conducting.

The multi-vibrator 101 is also of well known construction and comprises a pair of transistors 110 and 111 having their bases and collectors cross-connected through parallel connected resistors 112 and capacitors 113.

The bases of the transistors 110 and 111 are connected in series with diodes 114 and 115, respectively, and such diodes are connected to the collectors of their respective transistors through resistors 116 and 117, respectively, of different values. Such values are chosen to cause the resulting pulses to be "off" for greater periods of time, i.e., 30 milliseconds than their "on" times of 20 milliseconds.

Point 120 forming the output of transistor 111 is connected to a pulse shaping circuit generally indicated at 121 effective to produce a fast rising clock signal. The circuit comprises a transistor 122 whose base is connected to point 120 through parallel connected resistor 123 and capacitor 124. The collector of transistor 122 is clamped to ground through a Zener diode 125 so as to control the height of the pulse emitted by the pulse shaping circuit. The resulting pulses are applied over line 127 to both one input of an "and" gate 128 and, through capacitor 130 and diode 131, to the base of transistor 103 in the flip-flop 100, thereby normally maintaining the flip-flop in its reset condition.

Upon closing of the aforementioned switch 14, a positive signal will be applied through a delay circuit 129 comprising a resistor 128 and capacitor 130, through diode 131 and resistor 132 of a voltage attenuator comprising resistors 132 and 139, to the base of transistor 102, causing conduction of the latter to place the flip-flop 100 in a reset condition. The delay circuit insures that a second start signal cannot be initiated until after the stepping register has progressed through its various stages. Accordingly, a substantial ground potential is applied at point 133 and line 134, see also FIG. 2, to the point 30, thus partially discharging capacitor 23 in stage 11*a* to condition this stage for operation. At the same time, substantially ground potential will be applied to the second input of the "and" gate 128, thus applying a control pulse over line 27, see also FIG. 2. Since at this time the capacitor 23 is at least partially discharged, such control signal will be applied to the transistor 15 in the first stage 11*a* causing the latter transistor to conduct and applying positive potential to the first column line 20 and through whichever switch 36 in that column is closed to the corresponding digit line 37.

The different digit lines 37 are connected to respective ones of the solenoids 42 and 42*a* through driver transistors 135 whose emitters are connected to a common ground line 136 and whose collectors are connected to one side of the respective solenoid coils.

Figure 3:
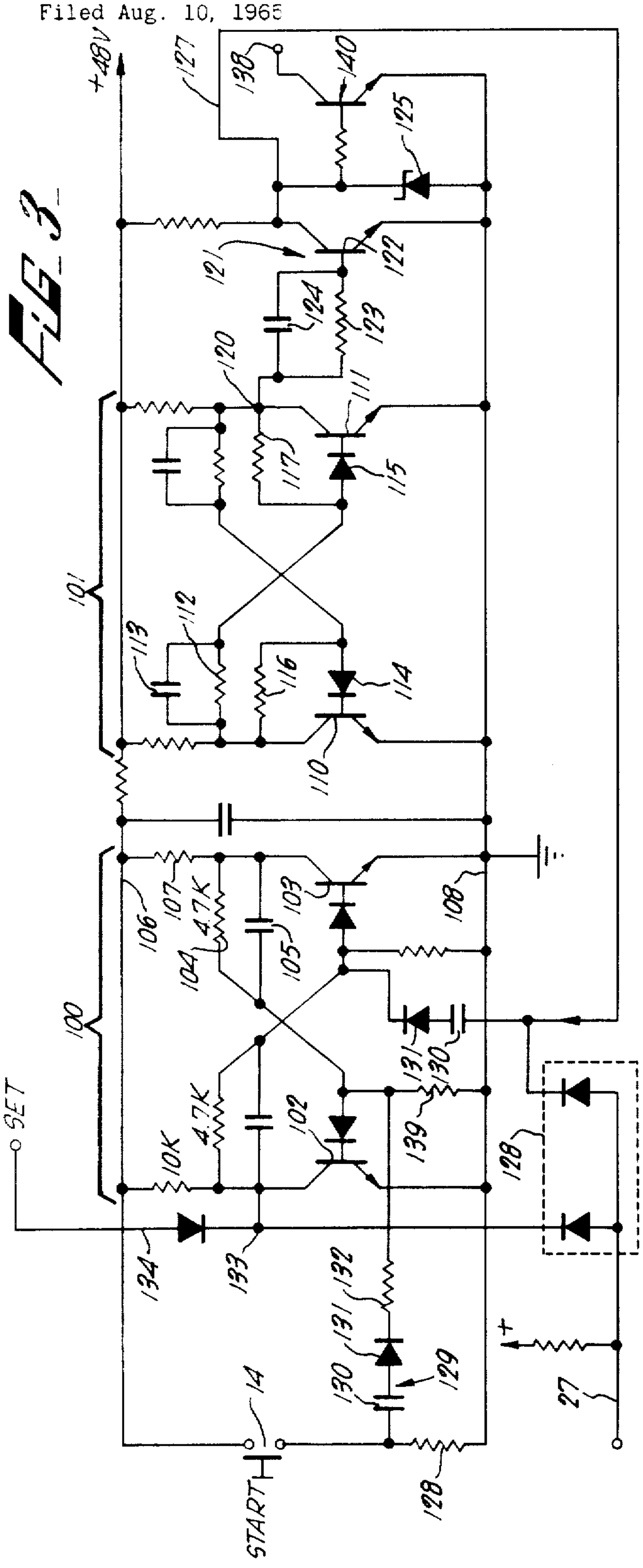
FIG. 3 is a detailed schematic view of the control flip-flop and clock pulse generating device.

In order to properly time the operation of the solenoids 42 and 42*a*, a switching transistor 137 is provided, having its collector connected through a common line 138 to the opposite sides of the coils of solenoids 42. The emitter of transistor 137 is connected to a source of +50 volts and its base is connected through line 138 (see also FIG. 3) to the collector of a driver transistor 140. The latter has its emitter connected to the ground line 108 and its base connected to the collector of the pulse shaping transistor 122. Thus, as the pulse shaping circuit 121 transmits a clock pulse to the transistor 140, it will cause transistor 137 to complete a circuit through a conditioned one of the solenoids 42 to set a corresponding stop pin in the pin carriage.

As is noted heretofore, the escapement stop pins 44*a* are depressed concurrently with setting of digit stop pins in the corresponding columns of the pin carriage and for this purpose the coil of solenoid 42*a* is connected by line 141 and isolating diodes 142 to the corresponding sides of the remaining coils of solenoids 42.

In case the digit line 37 representing the "9" digit is energized, only the coil of solenoid 42*a* is energized so that only the escapement pin for the corresponding order is depressed. In such case, during the ensuing cycle, the aligned sector 52 will be rotated to its extreme clockwise rocked position wherein a pin 143 on the sector will engage a stationary comb member 144, thereby locating the "9" type character directly below the associated hammer 63.

As each stage of the stepping register is rendered conductive, it will condition the succeeding stage by partially discharging its capacitor 23 through associated resistor 40 and will render the preceding stage non-conductive by applying a negative signal through capacitor 32 of such stage.

After the last digit entering stage 11*h* has been rendered conductive, the last or print command stage 11*g* will be activated, energizing the coil 150 of an electromagnetically operated switch 151.

As seen in FIG. 4, the switch 151 is connected in series with a resistor 152 across a power circuit comprising a positive potential supply line 153 and a ground line 154. When the switch 151 is closed, a negative signal is applied through capacitor 155 and diode 156 to a one-shot multivibrator generally indicated at 157. The latter comprises two transistors 158 and 160 having their bases and collectors cross connected in a well known manner. The multi-vibrator 157 is controlled by resistor 180 and capacitor 181 to remain set for a period of 55 milliseconds, and when set causes conduction of a transistor 161 connected in circuit with the coil of the solenoid 80 (see also FIG. 8) whereby to cause a cyclic operation of the machine.

Upon actuation of the clutch dog 76 by the solenoid 80 to initiate a machine cycle, a feedback switch 163 (FIGS. 2 and 8) is closed, thereby grounding the voltage supply for line 17 and resetting the shift register. The switch will be held closed until the end of the machine cycle, at which time the clutch dog 76 moves into its normal illustrated position, thereby opening the feedback switch 163 to permit a new operation of the stepping register.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by U.S. Letters Patent is:

1. A device for transferring information from a digit registering device including a plurality of columns of switching devices representing, respectively, the digits 0 to 9 to a cyclically operable digit registering machine of the ten-key type including independently operable devices for sequentially entering digit representations and a device for initiating operation of said machine;

comprising a stepping register having a plurality of stages, each of said stages being effective when scanned to condition a respective one of said columns of switching devices, means connecting each of said switching devices representing a particular digit to a said amount entering device representing said digit, a source of recurring pulses, means comprising a gate for applying said pulses to said register whereby to successively scan said stages, a flip-flop effective in a first condition to open said gate and effective in a second condition to close said gate, selectively operable means for setting said flip-flop in said second condition, means operable only when said flip-flop is in said second condition for conditioning an initial one of said stages for scanning, each of said stages when scanned conditioning a succeeding stage for scanning, and means controlled by a said pulse for setting said flip-flop in said first condition.

2. A device for transferring information from a digit registering device including a plurality of columns of switching devices representing, respectively, the digits 0 to 9 to a cyclically operable digit registering machine of the ten-key type including independently operable devices for sequentially entering digit representations and a device for initiating operation of said machine;

comprising a stepping register having a plurality of stages, each of said stages except one being effective when scanned to condition a respective one of said columns of switching devices, means connecting each of said switching devices representing a particular digit to a said amount entering device representing said digit, a source of recurring pulses, means comprising a gate for applying said pulses to said register whereby to successively scan said stages, a flip-flop effective in a first condition to open said gate and effective in a second condition to close said gate,
selectively operable means for setting said flip-flop in said second condition,
means operable only when said flip-flop is in said second condition for conditioning an initial one of said stages for scanning,
each of said stages when scanned conditioning a succeeding stage for scanning, and
means controlled by a said pulse for setting a said flip-flop in said first condition,
said one stage being effective when scanned to actuate said operation initiating device.

3. A device for transferring information from a digit registering device including a plurality of columns of switching devices representing, respectively, digits 0 to 9 to a digit registering machine of the ten-key type including independently operable devices for sequentially entering digit representations;
comprising a stepping register having a plurality of stages,
each of said stages being normally insensitive to stepping,
means connecting each of said switching devices representing a particular digit to a said amount entering device representing said digit,
a source of recurring pulses,
means comprising a gate for applying said pulses to each of said stages,
a flip-flop effective in a first condition to open said gate and effective in a second condition to close said gate,
selectively operable means for setting said flip-flop in said second condition,
means operable only when said flip-flop is in said second condition of rendering one of said stages sensitive to stepping upon receipt of a said pulse,
each of said stages when stepped rendering a succeeding stage sensitive to stepping, and
means controlled by said pulse for setting said flip-flop in said first condition.

4. A device according to claim 3 comprising a time delay device for preventing resetting of said flip-flop in said second condition until said stepping register has stepped through all of said stages.

5. A device for transferring information from a digit registering device including a plurality of columns of output connections representing, in each column, the digits 0 to 9 to a cyclically operable digit registering machine of the ten-key type including independently operable devices representing the digits 0 to 9 for sequentially entering digit representations and a device for initiating operation of said machine;
comprising a stepping register having a plurality of stages,
each of said stages being effective when scanned to condition a respective one of said columns of output connections,
means connecting said output connections to corresponding ones of said amount entering devices,
a source of recurring pulses,
means comprising a gate for applying said pulses to said register whereby to successively scan said stages,
a flip-flop effective in a first condition to open said gate and effective in a second condition to close said gate,
selectively operable means for setting said flip-flop in said second condition,
means operable only when said flip-flop is in said second condition for conditioning an initial one of said stages for scanning,
each of said stages when scanned conditioning a succeeding stage for scanning, and
means controlled by a said pulse for setting said flip-flop in said first condition.

References Cited

UNITED STATES PATENTS

| | | | |
|---|---|---|---|
| 2,951,636 | 9/1960 | La Pointe | 235—92.21 |
| 3,242,317 | 3/1966 | Reiss et al. | 340—172.5 X |
| 3,270,210 | 8/1966 | Mueller | 340—174 |
| 3,298,000 | 1/1967 | Sanders | 340—172.5 |

ROBERT C. BAILEY, *Primary Examiner.*

P. R. WOODS, *Assistant Examiner.*